(12) United States Patent
Wang et al.

(10) Patent No.: US 10,820,272 B2
(45) Date of Patent: Oct. 27, 2020

(54) CONNECTION METHOD AND CONNECTION DEVICE FOR BLUETOOTH DEVICE

(71) Applicant: GoerTek Technology Co., Ltd., Qingdao, Shandong Province (CN)

(72) Inventors: Xuemei Wang, Qingdao (CN); Gonghe Yue, Qingdao (CN); Minghui Hu, Qingdao (CN); Zhenhua Qin, Qingdao (CN)

(73) Assignee: GOERTEK TECHNOLOGY CO., LTD., Shandong Province (CN)

( * ) Notice: Subject to any disclaimer, the term of this patent is extended or adjusted under 35 U.S.C. 154(b) by 0 days.

(21) Appl. No.: 16/330,451

(22) PCT Filed: Dec. 29, 2016

(86) PCT No.: PCT/CN2016/113241
§ 371 (c)(1),
(2) Date: Mar. 5, 2019

(87) PCT Pub. No.: WO2018/053970
PCT Pub. Date: Mar. 29, 2018

(65) Prior Publication Data
US 2019/0335398 A1 Oct. 31, 2019

(30) Foreign Application Priority Data
Sep. 23, 2016 (CN) .......................... 2016 1 0847777

(51) Int. Cl.
*H04W 76/18* (2018.01)
*H04W 52/02* (2009.01)
(Continued)

(52) U.S. Cl.
CPC ......... *H04W 52/0258* (2013.01); *H04W 4/16* (2013.01); *H04W 4/80* (2018.02);
(Continued)

(58) Field of Classification Search
CPC ............ H04W 52/0258; H04W 76/18; H04W 76/28; H04W 76/14; H04W 4/80; H04W 4/16; H04W 48/08; H04W 80/04
See application file for complete search history.

(56) References Cited

U.S. PATENT DOCUMENTS

2006/0183472 A1   8/2006   Nookala et al.
2009/0209278 A1   8/2009   Narang et al.
(Continued)

FOREIGN PATENT DOCUMENTS

| CN | 101161020 A | 4/2008 |
| CN | 101668322 A | 3/2010 |

(Continued)

OTHER PUBLICATIONS

International Search Report (PCT/ISA/210) and Written Opinion (PCT/ISA/237) dated Jun. 22, 2017, by the Chinese Patent Office as the International Searching Authority for International Application No. PCT/CN2016/113241.
(Continued)

*Primary Examiner* — Kodzovi Acolatse
(74) *Attorney, Agent, or Firm* — Buchanan Ingersoll & Rooney PC

(57) ABSTRACT

A method and apparatus for connecting a Bluetooth device are disclosed. The method includes: setting a connecting cycle according to an obtained count of historical disconnections to a target Bluetooth device; and initiating establishment of a Bluetooth connection to the target Bluetooth device according to the connection cycle when the Bluetooth connection to the target Bluetooth device is disconnected. According to the present disclosure, a time interval that the Bluetooth device initiates the establishment of a Bluetooth connection after the Bluetooth connection is disconnected can be adjusted according to the application scene of the Bluetooth device, which can effectively save power for the (Continued)

device, prolong the runtime of the device, improve the user experience, and effectively guarantee the quality of communication.

12 Claims, 2 Drawing Sheets

(51) Int. Cl.
| | |
|---|---|
| *H04W 76/28* | (2018.01) |
| *H04W 76/14* | (2018.01) |
| *H04W 4/80* | (2018.01) |
| *H04W 4/16* | (2009.01) |
| *H04W 48/08* | (2009.01) |
| *H04W 80/04* | (2009.01) |

(52) U.S. Cl.
CPC .......... *H04W 48/08* (2013.01); *H04W 76/14* (2018.02); *H04W 76/18* (2018.02); *H04W 76/28* (2018.02); *H04W 80/04* (2013.01)

(56) References Cited

U.S. PATENT DOCUMENTS

| | | | |
|---|---|---|---|
| 2011/0058500 A1* | 3/2011 | Nagasaki | ............ H04W 8/183 |
| | | | 370/254 |
| 2015/0241998 A1 | 8/2015 | Vanblon et al. | |
| 2016/0314681 A1* | 10/2016 | Zhijian | ................ H04W 4/029 |
| 2017/0365134 A1* | 12/2017 | Kurian | ................ G07F 19/2055 |

FOREIGN PATENT DOCUMENTS

| | | | | |
|---|---|---|---|---|
| CN | 101690341 A | | 3/2010 | |
| CN | 105611491 | | 5/2016 | |
| CN | 105744466 | | 7/2016 | |
| CN | 106255051 A | | 12/2016 | |
| KR | 20130073224 A | * | 7/2013 | ............ H04W 76/18 |
| KR | 20130073224 A | | 7/2013 | |

OTHER PUBLICATIONS

First Office Action issued in corresponding Chinese Patent Application No. 201610847777.0, dated Mar. 13, 2019 and translation (10 pages).

* cited by examiner

CONNECTION METHOD AND CONNECTION DEVICE FOR BLUETOOTH DEVICE

TECHNICAL FIELD

The present disclosure relates to the technical field of wireless communication, and in particular, to a method and apparatus for connecting a Bluetooth device.

BACKGROUND

Bluetooth is a wireless technology standard for exchanging data over short distances between fixed devices, mobile devices, and building personal area networks. Bluetooth can connect multiple devices, which overcomes the challenges of data synchronization, and is widely used in telecommunications, computers, networks, and consumer electronics. Common Bluetooth products include Bluetooth headsets, Bluetooth speakers, etc. In recent years, wearable Bluetooth devices such as Bluetooth wristbands, Bluetooth watches, etc. have appeared. Users can use those wearable Bluetooth devices to pair and connect Bluetooth-enabled communication devices such as mobile phones, and answer a phone call received by a mobile phone through a wearable Bluetooth device, or send movement data collected by a wearable Bluetooth device to a mobile phone for gathering and displaying by the applications in the mobile phone, which provide the user a totally new user experience.

However, when a wearable Bluetooth device is used, the user usually wears the wearable device, but the Bluetooth communication device (such as a mobile phone) that is paired with the wearable Bluetooth device stays somewhere still. For example, the user wears a Bluetooth wristband and moves around at home, but the mobile phone is placed on the bed. In such an application environment, when the user moves, the communication distance between the wearable Bluetooth device and the Bluetooth communication device is sometimes short and sometimes long, and thus occasionally the Bluetooth connection is disconnected due to exceeding the Bluetooth communication distance. Moreover, in such a case, even if the Bluetooth connection is reestablished successfully, it will be very likely disconnected again when the user moves. According to the current Bluetooth transmission technology, a reconnection will be initiated once disconnected. However, in an unstable connection environment, if it is frequently disconnected, the probability of reconnection failure and the probability of re-disconnecting after successfully reconnected are both high, so reconnections occur frequently, and every reconnection will consume much power, and thus the wearable Bluetooth device will quickly use up the power and turn off.

Therefore, the inventors of the present disclosure believe that it is necessary to make improvement with respect to the above problems in the prior art.

SUMMARY

It is an object of the present disclosure to provide a new technical solution of Bluetooth connection.

According to a first aspect of the present disclosure, a method for connecting a Bluetooth device is provided, comprising:

setting a connecting cycle according to an obtained count of historical disconnections to a target Bluetooth device; and initiating establishment of a Bluetooth connection to the target Bluetooth device according to the connection cycle when the Bluetooth connection to the target Bluetooth device is disconnected.

Optionally, the method for connecting a Bluetooth device further comprises:

after the Bluetooth connection to the target Bluetooth device has been successfully established, if the Bluetooth connection to the target Bluetooth device is disconnected within a first connecting duration, increasing the count of historical disconnections by one.

Optionally, the method for connecting a Bluetooth device further comprises:

after the Bluetooth connection to the target Bluetooth device has been successfully established, if the Bluetooth connection to the target Bluetooth device is maintained for a second connecting duration, resetting the count of historical disconnections to zero.

Optionally, the method for connecting a Bluetooth device further comprises:

resetting the count of historical disconnections to zero in response to a request by the target Bluetooth device to disconnect the Bluetooth connection.

Optionally, the step of setting a connecting cycle according to an obtained count of historical disconnections to a target Bluetooth device further comprises:

when the count of historical disconnections is less than a first threshold, setting the connecting cycle as a first cycle;

when the count of historical disconnections is not less than the first threshold and is less than a second threshold, setting the connecting cycle as a second cycle; and when the count of historical disconnections is not less than the second threshold, setting the connecting cycle as a third cycle.

According to a second aspect of the present disclosure, an apparatus for connecting a Bluetooth device is provided, comprising:

a cycle setting unit for setting a connecting cycle according to an obtained count of historical disconnections to a target Bluetooth device; and a connection initiating unit for initiating establishment of a Bluetooth connection to the target Bluetooth device according to the connection cycle when the Bluetooth connection to the target Bluetooth device is disconnected.

Optionally, the apparatus for connecting a Bluetooth device further comprises:

a first counting unit for, after the Bluetooth connection to the target Bluetooth device has been successfully established, if the Bluetooth connection to the target Bluetooth device is disconnected within a first connecting duration, increasing the count of historical disconnections by one.

Optionally, the apparatus for connecting a Bluetooth device further comprises:

a second counting unit for, after the Bluetooth connection to the target Bluetooth device has been successfully established, if the Bluetooth connection to the target Bluetooth device is maintained for a second connecting duration, resetting the count of historical disconnections to zero.

Optionally, the apparatus for connecting a Bluetooth device further comprises:

a third counting unit for resetting the count of historical disconnections to zero in response to a request by the target Bluetooth device to disconnect the Bluetooth connection.

Optionally, the cycle setting unit is further for:

when the count of historical disconnections is less than a first threshold, setting the connecting cycle as a first cycle;

when the count of historical disconnections is not less than the first threshold and is less than a second threshold, setting the connecting cycle as a second cycle; and when the count of historical disconnections is not less than the second threshold, setting the connecting cycle as a third cycle.

The inventors of the present disclosure find that in the prior art there is not a method and apparatus for connecting a Bluetooth device so far which can establish a Bluetooth connection according to an application scenario of a Bluetooth device, so as to ensure the quality of Bluetooth communication and effectively save power for the device. Therefore, the technical task to be achieved or the technical problem to be solved by the present disclosure is not thought of or expected by a person skilled in the art, so the present disclosure is a new technical solution.

Other features and the advantages of the present disclosure will become apparent from the following detailed description of the exemplary embodiments of the present disclosure in conjunction with the accompanying drawings.

BRIEF DESCRIPTION OF DRAWINGS

The accompanying drawings, which are incorporated into and constitute part of the specification, illustrate the embodiments of the present disclosure and, together with the description thereof, serve to interpret the principle of the present disclosure.

DETAILED DESCRIPTION

Here, various exemplary embodiments of the present disclosure will be described in detail with reference to the drawings. It should be noted that, unless specified otherwise, the arrangements of the members and steps, and the mathematical formulas and numerical values described in these embodiments do not limit the scope of the present disclosure.

The following description on at least one exemplary embodiment is actually descriptive only, and should not be intended to limit the present disclosure and any application or use thereof.

The techniques, methods and devices well known to a person skilled in the art may not be discussed in detail. However, where applicable, such techniques, methods and devices should be deemed as part of the description.

Any specific value in all of the examples shown and discussed herein should be interpreted as illustrative only rather than restrictive. Therefore, other examples of the exemplary embodiments may include different values.

It should be noted that, similar reference numbers and letters in the following drawings represent similar items. Therefore, once defined in one drawing, an item is not required to be further discussed in the following drawings.

<Hardware Configuration>

Figure 1:
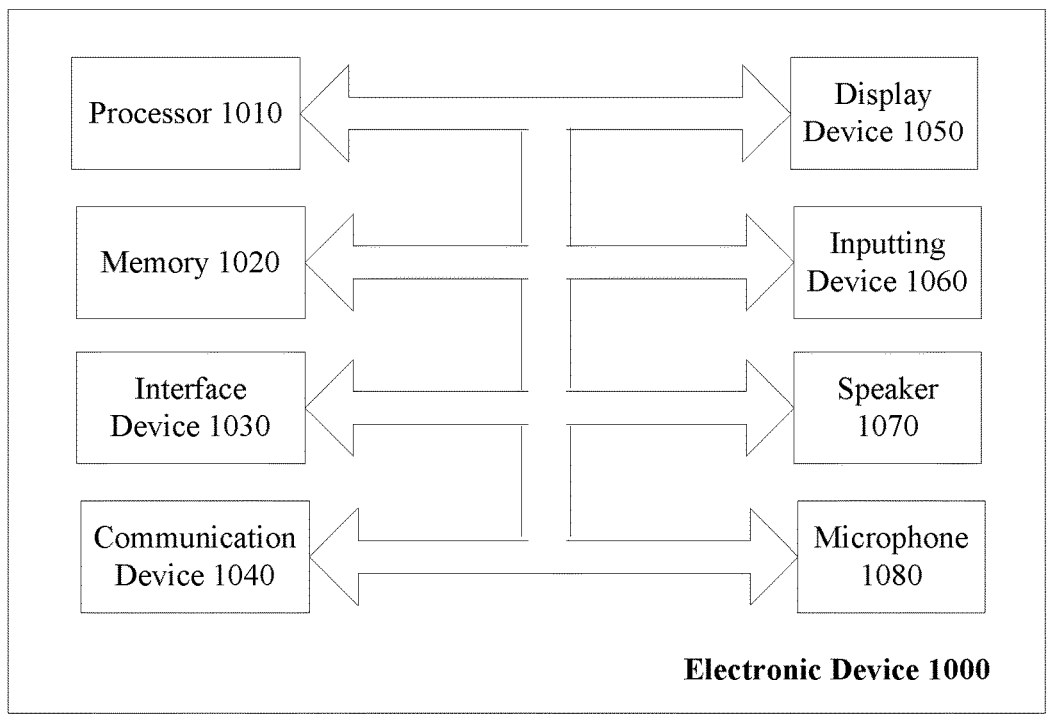
FIG. 1 is a schematic block diagram of a hardware configuration of an electronic device that can be used to implement an embodiment of the present disclosure.

FIG. 1 is a block diagram showing a hardware configuration of an electronic device 1000 which can be used to implement an embodiment of the present disclosure.

The electronic device 1000 may be a wearable Bluetooth device, such as a Bluetooth wristband, a Bluetooth watch, and a Bluetooth headset, or may be a communication device comprising a Bluetooth module such as a mobile phone. As shown in FIG. 1, the electronic device 1000 may comprise a processor 1010, a memory 1020, an interface device 1030, a communication device 1040, a display device 1050, an inputting device 1060, a speaker 1070, and a microphone 1080. The processor 1010 may be a central processing unit CPU, a microprocessor MCU, or the like. The memory 1020 may be, for example, a ROM (Read Only Memory), a RAM (Random Access Memory), a nonvolatile memory such as a hard disk, and the like. The interface device 1030 may be, for example, a USB interface, a headphone jack, and the like. The communication device 1040 can, for example, perform wired or wireless communication. The communication device 1040 comprises a module for Bluetooth communication. The display device 1050 may be, for example, a liquid crystal display, a touch display, or the like. The inputting device 1060 may be, for example, a touch screen, a keyboard, and the like. The user can input/output voice information through the speaker 1070 and the microphone 1080.

The electronic device 1000 shown in FIG. 1 is merely illustrative and is in no way intended to limit the present disclosure and its application or use. The memory 1020 of the electronic device 1000 used in the embodiments of the present disclosure is for storing instructions which are for controlling the processor 1010 to operate to implement any method for connecting a Bluetooth device according to the embodiments of the present disclosure.

It should be understood by a person skilled in the art that although the electronic device 1000 in FIG. 1 comprises a plurality of devices, the present disclosure may only involve some of the devices. For example, the electronic device 1000 only involves the processor 1010, the memory 1020, and the communication device 1040. A skilled person can design instructions according to the technical solutions disclosed in the present disclosure. It is well known in the art how to control the processor to operate by instructions, which will not be described in detail here.

Embodiments

Figure 2:
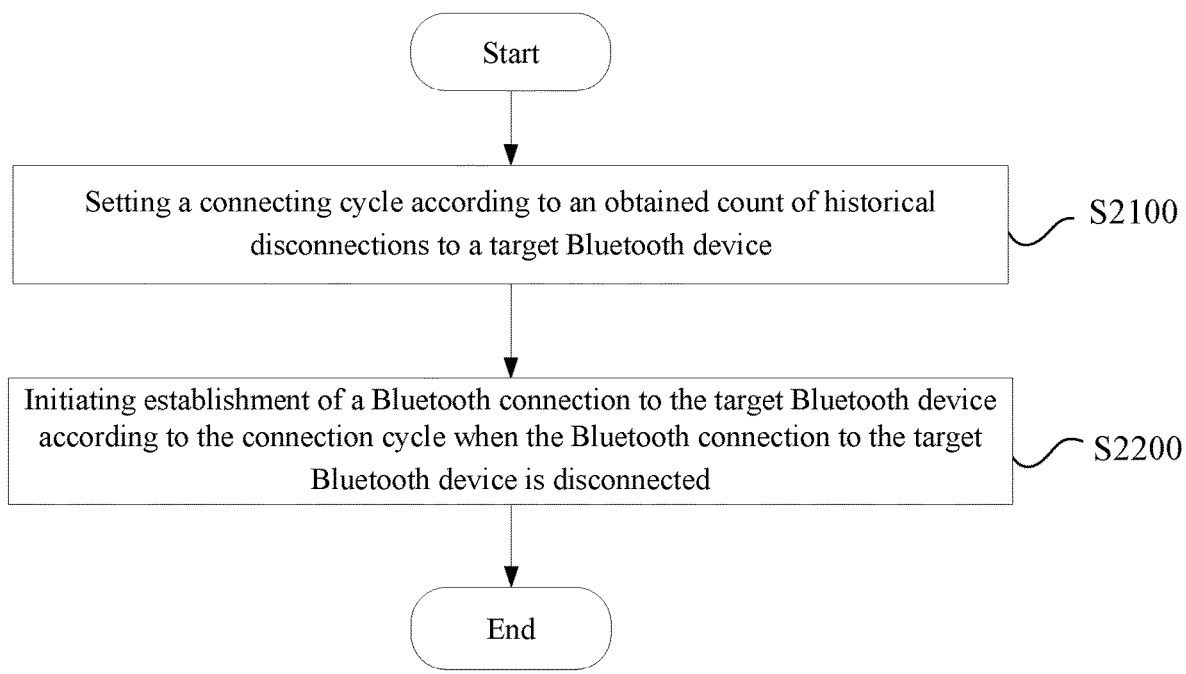
FIG. 2 is a flow chart showing a method for connecting a Bluetooth device according to an embodiment of the present disclosure.

In the present embodiment, a method for connecting a Bluetooth device is provided. As shown in FIG. 2, the method comprises:

Step S2100: setting a connecting cycle according to an obtained count of historical disconnections to a target Bluetooth device.

The method for connecting a Bluetooth device according to the present embodiment may be implemented on a Bluetooth device comprising a Bluetooth communication module, and is for enabling the Bluetooth device to establish a Bluetooth connection to the target Bluetooth device. The target Bluetooth device also comprises a Bluetooth communication module. In an example, the target Bluetooth device may be a mobile phone, and the Bluetooth device (referred to as the first Bluetooth device in the present embodiment) that implements the method according to the present embodiment may be a Bluetooth wearable device that is paired with the mobile phone, for example, a Bluetooth wristband.

In the present embodiment, the count of historical disconnections refers to the number of link losses, i.e., the number of times when a Bluetooth connection between the first Bluetooth device and the target Bluetooth device is disconnected.

The typical reasons of losing a Bluetooth connection between Bluetooth devices include that the distance between two Bluetooth devices exceeds the communication distance that Bluetooth communication can support, or that the signal of Bluetooth communication becomes unstable due to the application environment. In some application environments, the loss of a Bluetooth connection may also be caused by the user's behavior. For example, in a home environment, the target Bluetooth device is the user's mobile phone and is placed, for example, on the bed or on a table, and the first Bluetooth device paired with and connected to the target Bluetooth device is a Bluetooth wristband worn by the user. The user often moves around at home, so the communication distance between the Bluetooth wristband and the mobile phone is sometimes short and sometimes long, and thus occasionally the Bluetooth connection is disconnected due to exceeding the Bluetooth communication distance. Moreover, in such a case, even if the Bluetooth connection is reestablished successfully, it will be very likely disconnected again when the user moves. According to the current Bluetooth transmission technology, a reconnection will be initiated once disconnected. However, in an unstable connection environment, if it is frequently disconnected, the probability of reconnection failure and the probability of re-disconnecting after successfully reconnected are both high, so reconnections occur frequently, and every reconnection will consume much power, and thus the wearable Bluetooth device will quickly use up the power and turn off.

Therefore, with respect to the case of unstable Bluetooth connection that the Bluetooth connection between the Bluetooth devices is frequently disconnected, in the present embodiment, the count of historical disconnections may be specifically the counting of disconnections that a Bluetooth connection is disconnected again within a certain connecting duration after the first Bluetooth device successfully establishes a Bluetooth connection to the target Bluetooth device, thereby indicating whether the connection state between the first Bluetooth device and the target Bluetooth device is unstable. If the count of historical disconnections is greater, it indicates that the connection between the Bluetooth device and the target Bluetooth device will be disconnected more frequently, and the Bluetooth connection will be more unstable. Therefore, in an example, the method for connecting a Bluetooth device according to the present embodiment further comprises:

after the Bluetooth connection to the target Bluetooth device has been successfully established, if the Bluetooth connection to the target Bluetooth device is disconnected within a first connecting duration, increasing the count of historical disconnections by one.

The first connecting duration may be set according to engineering experience or the application scene, so that the obtained count of historical disconnections can accurately reflect whether the connection between the two Bluetooth devices in the application scene is really unstable. For a Bluetooth connection between a Bluetooth wearable device and a mobile phone in a limited activity space, such as a home environment, the first connecting duration may be set to 3 minutes.

Further, in some scenes, the loss of the Bluetooth connection between the two Bluetooth devices does not occur continuously. In such scenes, if the number of times when a Bluetooth connection is disconnected in the first connecting duration after the Bluetooth connection is successfully established are all counted as the count of historical disconnections, the count of historical disconnections cannot accurately reflect the frequency at which the Bluetooth connection between the Bluetooth devices is disconnected. Therefore, in an example, the method for connecting a Bluetooth device according to the present embodiment further comprises:

after the Bluetooth connection to the target Bluetooth device has been successfully established, if the Bluetooth connection to the target Bluetooth device is maintained for a second connecting duration, resetting the count of historical disconnections to zero.

The second connecting duration may be set according to engineering experience or the application scene, so that the obtained count of historical disconnections can reflect the frequency at which the Bluetooth connection between the Bluetooth devices is disconnected. For the Bluetooth connection between a Bluetooth wearable device and a mobile phone in a limited activity space, such as a home environment, the second connecting duration may be set to be the same as the first connecting duration, for example, set to 3 minutes.

In some scenes, a target Bluetooth device may actively initiate a disconnecting of the Bluetooth connection. For example, the target Bluetooth device is a mobile phone, which may provide an interface for the user to turn off the Bluetooth connection according to his own needs. Such a Bluetooth disconnecting should not be counted as a loss of connection; otherwise the count of historical disconnections cannot accurately reflect the frequency at which the Bluetooth connection between the Bluetooth devices is disconnected. Therefore, in an example, the method for connecting a Bluetooth device according to the present embodiment further comprises:

resetting the count of historical disconnections to zero in response to a request by the target Bluetooth device to disconnect the Bluetooth connection.

In the present embodiment, after the count of historical disconnections is acquired, a connecting cycle is set according to the count of historical disconnections. The connecting cycle refers to a time interval at which the first Bluetooth device initiates the reestablishment of the Bluetooth connection after a Bluetooth connection to the target Bluetooth device is disconnected.

For example, the connecting cycle is 5 seconds. When a Bluetooth connection to the target Bluetooth device is disconnected, the first Bluetooth device will immediately initiate establishment of a Bluetooth connection to the target Bluetooth device. However, if the Bluetooth connection cannot be successfully established, the first Bluetooth device will reinitiate a Bluetooth connection to the target Bluetooth device after a time interval of 5 seconds. The process is repeated until a Bluetooth connection is successfully established.

For a Bluetooth device, the process of initiating establishment of a Bluetooth connection consumes much power of the device. If the establishment of a Bluetooth connection is frequently initiated, the power of the Bluetooth device will be exhausted very quickly, which may result in a poor user experience in the using of the Bluetooth device. Therefore, in the present embodiment, by setting a connecting cycle according to the count of historical disconnections, which can characterize the frequency of loss of the Bluetooth connection, the Bluetooth device that needs to initiate the reconnection can reestablish the Bluetooth connection to the target Bluetooth device according to the connecting cycle.

Specifically, in an example, the step of setting a connecting cycle according to an acquired time quantity of historical disconnections to a target Bluetooth device may comprise:

when the count of historical disconnections is less than a first threshold, setting the connecting cycle as a first cycle;

when the count of historical disconnections is not less than the first threshold and is less than a second threshold, setting the connecting cycle as a second cycle; and when the count of historical disconnections is not less than the second threshold, setting the connecting cycle as a third cycle.

The first threshold, the second threshold, the first cycle, the second cycle, and the third cycle may be set according to engineering experience or the application scene, so that when the Bluetooth connection is frequently disconnected, the Bluetooth device which need reestablish the Bluetooth connection will not initiate establishment of a Bluetooth connection to the target Bluetooth device frequently. Instead, it initiates the reestablishment of the Bluetooth connection according to a connecting cycle that conforms to the application scene. By doing in this way, the Bluetooth connection will not be initiated frequently, which avoids the waste of the device power, and moreover, the reestablishment of the Bluetooth connection can be effectively ensured.

For example, in a home environment, the target Bluetooth device is a mobile phone placed on the bed still, and the first Bluetooth device is a Bluetooth wearable device worn by the user, such as a Bluetooth wristband. When the user frequently moves in a large area at home, the Bluetooth connection between the mobile phone and the Bluetooth wristband will be disconnected frequently. The Bluetooth wristband may, according to the above method, set a large connecting cycle to initiate the Bluetooth connection so as not to initiate the Bluetooth connection frequently when the connection is unstable, which can avoid the waste of the power of the Bluetooth wristband. On the other hand, when the user only moves in a small area at home, for example, only moves in the bedroom, the count of historical disconnections between the mobile phone and the Bluetooth wristband is small, and the communication distance between the mobile phone and the Bluetooth wristband is relatively stable. In such a case, a small connecting cycle may be set to initiate a Bluetooth connection, so that the Bluetooth connection between the Bluetooth wristband and the mobile phone can be restored as soon as possible.

Specifically, in the above example, the first threshold may be set to 3 times, the second threshold may be set to 6 times, the first cycle may be set to 15 seconds, the second cycle may be set to 55 seconds, and the third cycle may be set to 600 seconds. In other words, when the count of historical disconnections is less than 3 times, the Bluetooth wristband initiates the reestablishment of the Bluetooth connection according to the connecting cycle of 15 seconds; when the count of historical disconnections is not less than 3 times and is less than 6 times, the Bluetooth wristband initiates the reestablishment of the Bluetooth connection according to the connecting cycle of 55 seconds; and when the count of historical disconnections is more than 6 times, the Bluetooth wristband initiates the reestablishment of the Bluetooth connection according to the connecting cycle of 600 seconds.

After the connecting cycle is set in Step S2100, the process proceeds to Step S2200; that is, when a Bluetooth connection to the target Bluetooth device is disconnected, initiating establishment of a Bluetooth connection to the target Bluetooth device according to the connecting cycle.

The method for connecting a Bluetooth device according to the present embodiment as shown in FIG. 2 has been described above. The method can adjust the time interval during which the Bluetooth device initiates the establishment of a Bluetooth connection after a Bluetooth connection is disconnected according to the actual application scene, so that the Bluetooth connection will not be frequently initiated in a scene where the Bluetooth connection is unstable, so as to avoid the waste of the device power, and meanwhile, the Bluetooth connection can be restored as soon as possible in a scene where the Bluetooth connection is relatively stable. Thus, the method can effectively save power for the device, prolong the runtime of the device, improve the user experience, and effectively guarantee the quality of communication.

Figure 3:
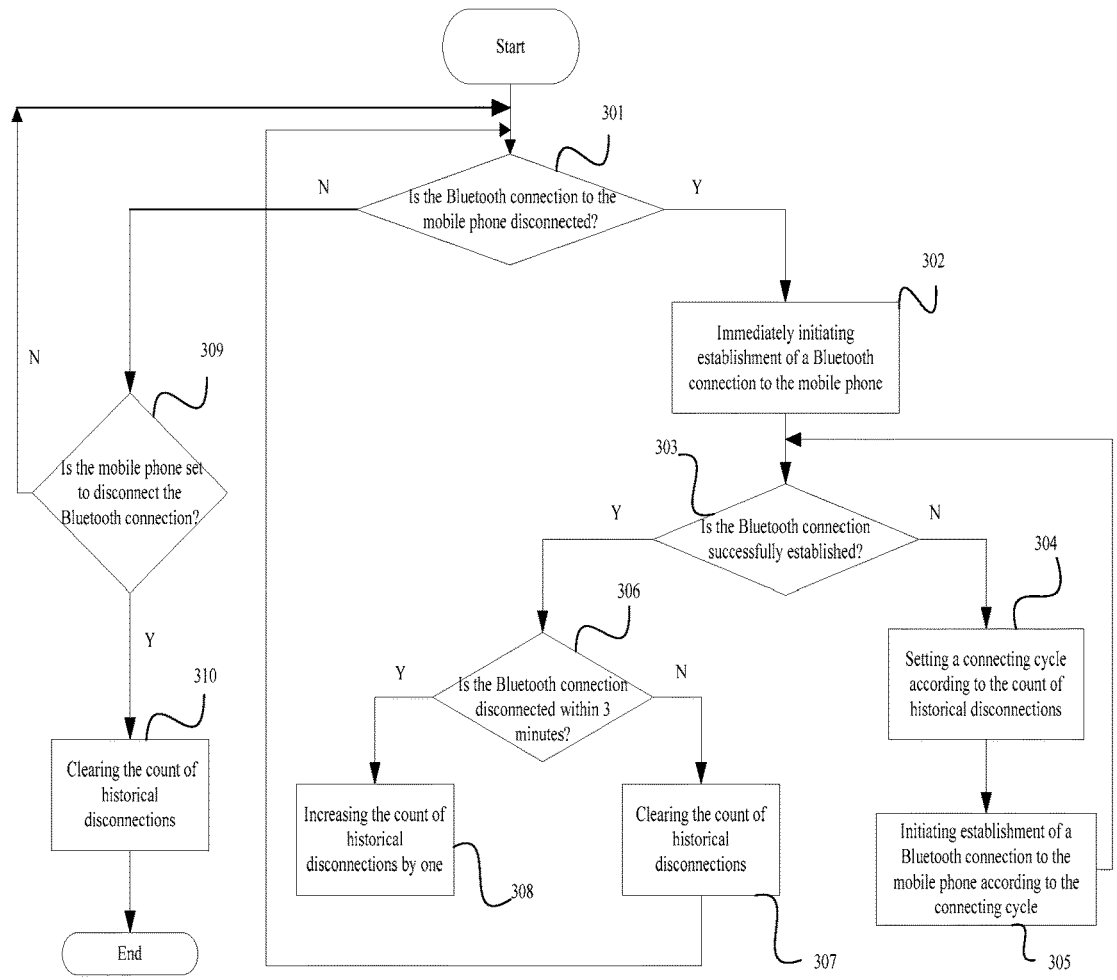
FIG. 3 is a schematic diagram showing an example of a method for connecting a Bluetooth device according to an embodiment of the present disclosure.

The method for connecting a Bluetooth device according to the present embodiment will be further described below with reference to an example, as shown in FIG. 3. The application environment in this example is a home environment, and the target Bluetooth device is a mobile phone. The Bluetooth device that implements the method in this example is a Bluetooth wristband that matches with and is connected to the mobile phone and is worn on the wrist of the user. As shown in FIG. 3, the method for connecting the Bluetooth wristband to the mobile phone comprises the following steps.

In Step S301, if the Bluetooth wristband loses the Bluetooth connection to the mobile phone, the process proceeds to Step S302; otherwise, the Bluetooth wristband and the mobile phone maintain the Bluetooth connection, and the process proceeds to Step S309.

In Step S302, the Bluetooth wristband immediately initiates establishment of a Bluetooth connection to the mobile phone, and the process proceeds to Step S303.

In Step S303, if the Bluetooth wristband fails to reestablish the Bluetooth connection for the first time, the process proceeds to Step S304; otherwise, after the Bluetooth connection to the mobile phone is successfully established, the process proceeds to Step S306.

In Step S304, a connecting cycle is set according to the currently acquired count of historical disconnections. In this example, when the count of historical disconnections is less than 3 times, the connecting cycle is 15 seconds; when the count of historical disconnections is not less than 3 times and is less than 6 times, the connecting cycle is 55 seconds; and when the count of historical disconnections is more than 6 times, the connecting cycle is 600 seconds. After the connecting cycle is set, the process proceeds to Step S305.

In Step S305, the establishment of a Bluetooth connection to the mobile phone is initiated according to the connecting cycle, and then the process returns to Step S303, and performs the subsequent steps according to whether the Bluetooth connection has been successfully established.

In Step S306, in this example, the first connecting duration and the second connecting duration are both set to 3 minutes. After the Bluetooth wristband successfully establishes a Bluetooth connection to the mobile phone, if the Bluetooth connection to the mobile phone is disconnected within 3 minutes, the process proceeds to Step S308. Otherwise, if the Bluetooth connection to the mobile phone is still maintained within 3 minutes, the process proceeds to Step S307.

In Step S307, the count of historical disconnections is cleared; that is, the count of historical disconnections is reset to 0, and then the process returns to Step S301.

In Step S308, the count of historical disconnections is increased by 1, and then the process returns to Step S301.

In Step S309, if the mobile phone is set to disconnect the Bluetooth connection, the process proceeds to Step S310; otherwise, the process returns to Step S301.

In Step S310, the count of historical disconnections is cleared; that is, the count of historical disconnections is reset to 0, and the process ends.

In the above example, the connecting cycle is set according to the count of historical disconnections. When the count of historical disconnections is small, the connection between the Bluetooth wristband and the mobile phone is relatively stable, and a small connecting cycle is set. As the count of historical disconnections increases, the connection between the Bluetooth wristband and the mobile phone becomes unstable, the connecting cycle is correspondingly increased, so that the Bluetooth wristband can initiate the establishment of a Bluetooth connection at a proper time interval according to the change of the application scene after the Bluetooth connection to the mobile phone is disconnected. By doing in this way, the establishment of the Bluetooth connection will not be frequently initiated in a scene where the Bluetooth connection is unstable so as to avoid the waste of the device power, and meanwhile, the Bluetooth connection to the mobile phone will be restored as soon as possible in a scene where the Bluetooth connection is relatively stable, which can effectively save power for the device, prolong the runtime of the device, improve the user experience, and effectively guarantee the quality of communication.

Figure 4:
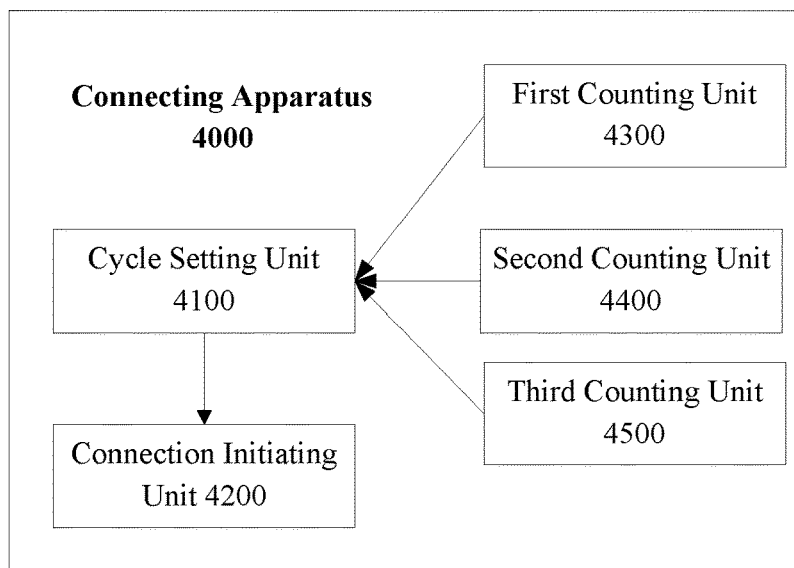
FIG. 4 shows a schematic block diagram of an apparatus for connecting a Bluetooth device according to an embodiment of the present disclosure.

In the present embodiment, an apparatus for connecting a Bluetooth device 4000 (also referred to as "connecting apparatus 4000" hereinafter) is further provided. As shown in FIG. 4, the connecting apparatus 4000 comprises a cycle setting unit 4100 and a connection initiating unit 4200. Optionally, the connecting apparatus 4000 further comprises a first counting unit 4300, a second counting unit 4400, and a third counting unit 4500. The connecting apparatus 4000 is for implementing the method for connecting a Bluetooth device according to the present embodiment, the details of which are not repeated here.

The connecting apparatus 4000 comprises:

the cycle setting unit 4100 for setting a connecting cycle according to an obtained count of historical disconnections to a target Bluetooth device; and the connection initiating unit 4200 for initiating establishment of a Bluetooth connection to the target Bluetooth device according to the connection cycle when the Bluetooth connection to the target Bluetooth device is disconnected.

Optionally, the connecting apparatus 4000 further comprises:

the first counting unit 4300 for, after the Bluetooth connection to the target Bluetooth device has been successfully established, if the Bluetooth connection to the target Bluetooth device is disconnected within a first connecting duration, increasing the count of historical disconnections by one.

Optionally, the connecting apparatus 4000 further comprises:

the second counting unit 4400 for, after the Bluetooth connection to the target Bluetooth device has been successfully established, if the Bluetooth connection to the target Bluetooth device is maintained for a second connecting duration, resetting the count of historical disconnections to zero.

Optionally, the connecting apparatus 4000 further comprises:

the third counting unit 4500 for resetting the count of historical disconnections to zero in response to a request by the target Bluetooth device to disconnect the Bluetooth connection.

Optionally, the cycle setting unit 4100 is further for:

when the count of historical disconnections is less than a first threshold, setting the connecting cycle as a first cycle;

when the count of historical disconnections is not less than the first threshold and is less than a second threshold, setting the connecting cycle as a second cycle; and when the count of historical disconnections is not less than the second threshold, setting the connecting cycle as a third cycle.

In the present embodiment, the specific implementation of the connecting apparatus 4000 is not limited. For example, the connecting apparatus 4000 may be a module comprised in the Bluetooth device, or may be an external module of the Bluetooth device. In an example, the connecting apparatus 4000 may also be a Bluetooth device having the function of implementing the method for connecting a Bluetooth device according to the present embodiment, such as a Bluetooth wristband.

The embodiments of the present disclosure have been described above with reference to the accompanying drawings and examples. According to the present disclosure, a method and apparatus for connecting a Bluetooth device are disclosed. According to the method and device, a time interval that the Bluetooth device initiates the establishment of a Bluetooth connection after the Bluetooth connection is disconnected can be adjusted according to the application scene of the Bluetooth device, so that the establishment of the Bluetooth connection will not be frequently initiated in a scene where the Bluetooth connection is unstable so as to avoid the waste of the device power, and meanwhile, the Bluetooth connection to the mobile phone will be restored as soon as possible in a scene where the Bluetooth connection is relatively stable, which can effectively save power for the device, prolong the runtime of the device, improve the user experience, and effectively guarantee the quality of communication. The present disclosure is especially suitable for a home environment in which a Bluetooth wearable device worn by the user and a mobile phone staying still are connected, and can effectively prolong the runtime of the Bluetooth wearable device and improve the user experience.

A person skilled in the art will appreciate that, the connecting apparatus 4000 may be implemented in various ways. For example, the connecting apparatus 4000 may be implemented by a processor configured by instructions. For example, the instructions may be stored in the ROM, and when the device is booted, the instructions are read from the ROM into a programmable device to implement the connecting apparatus 4000. For example, the connecting apparatus 4000 may be embedded into a dedicated device (such as an ASIC). The connecting apparatus 4000 may be divided into independent units, or they may be implemented together. The connecting apparatus 4000 may be implemented by one of the various implementations described above, or may be implemented by a combination of two or more of the various implementations described above.

It is well known to a person skilled in the art that, with the development of electronic information technology such as large scale integrated circuit technology and the trend of software hardening, it becomes difficult to clearly define the boundary between software and hardware of computer systems. Any operation may be implemented by software, and may also be implemented by hardware. Any instruction may be executed by hardware, and may also be executed by software. It depends on non-technical factors such as price, speed, reliability, storage capacity, and change period whether a certain machine function is implemented by hardware or by software. Therefore, for a person skilled in the art of electronic information technology, a more straightforward and clearer way of describing a technical solution is to describe the operations in the technical solution. A person skilled in the art can directly design the desired product based on consideration of the non-technical factors if the operations to be performed are known.

The present disclosure may be implemented as a system, a method and/or a computer program product. The computer program product may comprise a computer readable storage medium having a computer readable program instruction thereon for causing a processor to carry out the aspects of the present disclosure.

The computer readable storage medium may be a tangible device that can retain and store an instruction for use by an instruction execution device. The computer readable storage medium may be, for example, but is not limited to, an electronic storage device, a magnetic storage device, an optical storage device, an electromagnetic storage device, a semiconductor storage device, or any suitable combination thereof. A non-exhaustive list of more specific examples of the computer readable storage medium includes: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having an instruction recorded thereon, and any suitable combination thereof. A computer readable storage medium, as used herein, is not to be construed as being a transitory signal per se, such as a radio wave or other freely propagating electromagnetic waves, an electromagnetic wave propagating through a waveguide or other transmission media (for example, a light pulse passing through a fiber-optic cable), or an electrical signal transmitted through a wire.

The computer readable program instructions described herein may be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives the computer readable program instructions from the network and forwards the computer readable program instructions for storage in a computer readable storage medium within the respective computing/processing device.

The computer readable program instructions for carrying out the operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the scenario that involves a remote computer, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform the aspects of the present disclosure.

Various aspects of the present disclosure are described in reference with the flow chart and/or block diagram of the method, apparatus (system) and computer program product according to the embodiments of the present disclosure. It should be understood that each block in the flow chart and/or block diagram and any combinations of the blocks in the flow chart and/or block diagram may be implemented by the computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement the aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable data processing apparatus, or other device to produce a computer implemented process, such that the instructions which execute on the computer, the other programmable data processing apparatus, or the other device implement the functions/acts specified in the flowchart and/or block diagram block or blocks.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed substantially in parallel, and sometimes they may also be executed in a reverse order, depending on the involved functions. It should also be noted that each block in the block diagram and/or flow chart, and any combinations of the blocks in the block diagram and/or flow chart may be implemented by a dedicated hardware-based system for implementing specified functions or actions, or a combination of the dedicated hardware and the computer instructions. It is well known to a person skilled in the art that the implementation by hardware, the implementation by software, and the implementation by a combination of software and hardware are equivalent.

Various embodiments of the present disclosure have been described above, and the above explanation is illustrative rather than exhaustive and is not limited to the disclosed embodiments. Without departing from the scope and spirit of each interpreted embodiment, many alterations and modifications are obvious for a person skilled in the art. The selection of the terms in the text aims to best interpret the principle, actual application or technical improvement in the market of each embodiment or make each embodiment disclosed in the text comprehensible for a person skilled in the art. The protection scope of the present disclosure should be determined by the appended claims.

What is claimed is:

1. A method for connecting a Bluetooth device, comprising:
    setting a connecting cycle according to an obtained count of historical disconnections to a target Bluetooth device; and
    initiating establishment of a Bluetooth connection to the target Bluetooth device according to the connection cycle when the Bluetooth connection to the target Bluetooth device is disconnected;
    wherein the step of setting a connecting cycle according to an obtained count of historical disconnections to a target Bluetooth device comprises:
        in response to the count of historical disconnections being less than a first threshold, setting the connecting cycle as a first cycle;
        in response to the count of historical disconnections being not less than the first threshold and is less than a second threshold, setting the connecting cycle as a second cycle; and
        in response to the count of historical disconnections being not less than the second threshold, setting the connecting cycle as a third cycle;
        wherein the first cycle is less than the second cycle, and the second cycle is less than the third cycle.

2. The method according to claim 1, further comprising:
    after the Bluetooth connection to the target Bluetooth device has been successfully established, if the Bluetooth connection to the target Bluetooth device is disconnected within a first connecting duration, increasing the count of historical disconnections by one.

3. The method according to claim 1, further comprising:
    after the Bluetooth connection to the target Bluetooth device has been successfully established, if the Bluetooth connection to the target Bluetooth device is maintained for a second connecting duration, resetting the count of historical disconnections to zero.

4. The method according to claim 1, further comprising:
    resetting the count of historical disconnections to zero in response to a request by the target Bluetooth device to disconnect the Bluetooth connection.

5. An apparatus for connecting a Bluetooth device, comprising a processor and a non-transitory computer readable storage medium, wherein the computer readable storage medium stores computer readable program instructions thereon which can be read by the processor, and the computer readable program instructions are processed by the processor to perform the following steps:
    setting a connecting cycle according to an obtained count of historical disconnections to a target Bluetooth device; and
    initiating establishment of a Bluetooth connection to the target Bluetooth device according to the connection cycle when the Bluetooth connection to the target Bluetooth device is disconnected;
    wherein the step of setting a connecting cycle according to an obtained count of historical disconnections to a target Bluetooth device comprises:
        in response to the count of historical disconnections being less than a first threshold, setting the connecting cycle as a first cycle;
        in response to the count of historical disconnections being not less than the first threshold and is less than a second threshold, setting the connecting cycle as a second cycle; and
        in response to the count of historical disconnections being not less than the second threshold, setting the connecting cycle as a third cycle;
        wherein the first cycle is less than the second cycle, and the second cycle is less than the third cycle.

6. The apparatus according to claim 5, wherein the steps performed by the processor further comprise:
    after the Bluetooth connection to the target Bluetooth device has been successfully established, if the Bluetooth connection to the target Bluetooth device is disconnected within a first connecting duration, increasing the count of historical disconnections by one.

7. The apparatus according to claim 5, wherein the steps performed by the processor further comprise:
    after the Bluetooth connection to the target Bluetooth device has been successfully established, if the Bluetooth connection to the target Bluetooth device is maintained for a second connecting duration, resetting the count of historical disconnections to zero.

8. The apparatus according to claim 5, wherein the steps performed by the processor further comprise:
    resetting the count of historical disconnections to zero in response to a request by the target Bluetooth device to disconnect the Bluetooth connection.

9. An electronic device comprising a processor, a memory, and a communication device, wherein the communication device comprises a module for Bluetooth communication, the memory is configured to store instructions, and the instructions are for controlling the processor to perform the following steps:
    setting a connecting cycle according to an obtained count of historical disconnections to a target Bluetooth device; and
    initiating establishment of a Bluetooth connection to the target Bluetooth device according to the connection cycle when the Bluetooth connection to the target Bluetooth device is disconnected;
    wherein the setting a connecting cycle according to an obtained count of historical disconnections to a target Bluetooth device comprises:
        in response to the count of historical disconnections being less than a first threshold, setting the connecting cycle as a first cycle;

in response to the count of historical disconnections being not less than the first threshold and is less than a second threshold, setting the connecting cycle as a second cycle; and in response to the count of historical disconnections being not less than the second threshold, setting the connecting cycle as a third cycle;

wherein the first cycle is less than the second cycle, and the second cycle is less than the third cycle.

10. The device according to claim 9, wherein the steps performed by the processor further comprise:

after the Bluetooth connection to the target Bluetooth device has been successfully established, if the Bluetooth connection to the target Bluetooth device is disconnected within a first connecting duration, increasing the count of historical disconnections by one.

11. The device according to claim 9, wherein the steps performed by the processor further comprise:

after the Bluetooth connection to the target Bluetooth device has been successfully established, if the Bluetooth connection to the target Bluetooth device is maintained for a second connecting duration, resetting the count of historical disconnections to zero.

12. The device according to claim 9, wherein the steps performed by the processor further comprise:

resetting the count of historical disconnections to zero in response to a request by the target Bluetooth device to disconnect the Bluetooth connection.

* * * * *